(12) United States Patent
Sharma et al.

(10) Patent No.: US 12,069,525 B2
(45) Date of Patent: Aug. 20, 2024

(54) COMMUNICATIONS DEVICE, INFRASTRUCTURE EQUIPMENT AND METHODS

(71) Applicant: Sony Group Corporation, Tokyo (JP)

(72) Inventors: Vivek Sharma, Basingstoke (GB); Yuxin Wei, Basingstoke (GB); Anders Berggren, Lund (SE); Yassin Aden Awad, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 399 days.

(21) Appl. No.: 17/428,982

(22) PCT Filed: Jan. 17, 2020

(86) PCT No.: PCT/EP2020/051132
§ 371 (c)(1),
(2) Date: Aug. 6, 2021

(87) PCT Pub. No.: WO2020/164856
PCT Pub. Date: Aug. 20, 2020

(65) Prior Publication Data
US 2022/0030489 A1    Jan. 27, 2022

(30) Foreign Application Priority Data
Feb. 14, 2019  (EP) ..................... 19157276

(51) Int. Cl.
*H04W 36/08*   (2009.01)
*H04W 76/10*   (2018.01)
*H04W 76/27*   (2018.01)

(52) U.S. Cl.
CPC ........... *H04W 36/08* (2013.01); *H04W 76/10* (2018.02); *H04W 76/27* (2018.02)

(58) Field of Classification Search
CPC ..... H04W 36/08; H04W 76/10; H04W 76/27; H04W 48/20; H04W 60/04
See application file for complete search history.

(56) References Cited

U.S. PATENT DOCUMENTS 8,675,576 B2 *  3/2014  Arora .................. H04L 1/1829
                                             370/216
9,510,252 B2 * 11/2016  Kim ..................... H04W 8/18
(Continued)

OTHER PUBLICATIONS

International Search Report and Written Opinion mailed on Mar. 19, 2020, received for PCT Application PCT/EP2020/051132, Filed on Jan. 17, 2020, 15 pages.

(Continued)

*Primary Examiner* — Julio R Perez
(74) *Attorney, Agent, or Firm* — XSENSUS LLP

(57) ABSTRACT

A method of operating a communications device to perform cell reselection in a wireless communications network, the method comprising establishing a radio resource control (RRC) connection, suspending the RRC connection, transmitting a first message in a first cell, the message comprising a request that the RRC connection be resumed, before the RRC connection is resumed in the first cell, selecting as a serving cell a second cell different from the first cell, and transmitting a second message in the second cell, the second message comprising a request that the RRC connection be resumed.

19 Claims, 8 Drawing Sheets

(56) References Cited

U.S. PATENT DOCUMENTS

| | | | |
|---|---|---|---|
| 11,758,444 B2* | 9/2023 | Kim | H04L 5/0091 370/310 |
| 2017/0202050 A1* | 7/2017 | Deng | H04W 76/18 |
| 2018/0199385 A1* | 7/2018 | Ramkull | H04W 36/0094 |
| 2021/0385727 A1* | 12/2021 | Ohlsson | H04W 76/19 |

OTHER PUBLICATIONS

3GPP "NR; Medium Access Control (MAC) Protocol Specification (Release 15)", 3GPP TS 38.321 V15.3.0, Sep. 2018, pp. 1-76.

Holma et al., "LTE for UMTS OFDMA and SC-FDMA Based Radio Access", John Wiley and Sons, 2009, pp. 25-27.

3GPP, "NR; NR and NG-RAN Overall Description; Stage 2 (Release 15)", 3GPP TS 38.300 V15.2.0, Jun. 2018, pp. 1-87.

3GPP, "LS on Intra-UE Prioritization/Multiplexing", 3GPP TSG-RAN WG2 Meeting #104, R2-1818795, Nov. 12-16, 2018, 2 pages.

Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.

Nokia et al., "Revised SID: Study on NR Industrial Internet of Things (IoT)", 3GPP TSG RAN meeting #81, RP-182090, Sep. 10-13, 2018, 5 pages.

3GPP, "Study on Physical Layer Enhancements for NR Ultra-Reliable and Low Latency Case (URLLC) (Release 16)", 3GPP TR 38.824 V1.0.0, Nov. 2018, pp. 1-22.

3GPP, "NR; User Equipment (UE) Procedures in Idle Mode and RRC Inactive State (Release 15)", 3GPP TS 38.304 V15.2.0, Dec. 2018, pp. 1-28.

3GPP, "NR; Radio Resource Control (RRC) Protocol Specification (Release 15)", 3GPP TS 38.331 V15.3.0, Sep. 2018, pp. 1-445.

Intel Corporation, "Open Issues Related to Connection Resume Procedure", 3GPP TSG RAN WG2 Meeting #101bis, R2-1805015, Apr. 16-20, 2018, 3 pages.

Intel Corporation, "Clarification on Cell Reselection During Resume Procedure", 3GPP TSG RAN WG2 Meeting#102, R2-1807356, May 21-25, 2018, 4 pages.

Ericsson, "Actions Upon Cell Reselection While T300X is Running", 3GPP TSG-RAN WG2 #102, Tdoc R2-1807920, May 21-25, 2018, pp. 1-5.

ZTE Corporation, "UE Behaviour for Pending as Procedures After Cell Reselection (Offline Discussion #36)", 3GPP TSG-RAN WG2 Meeting#102, R2-1809112, May 21-25, 2018, 11 pages.

\* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2020/051132, filed Jan. 17, 2020, which claims priority to EP 19157276.7, filed Feb. 14, 2019, the entire contents of each are incorporated herein by reference.

BACKGROUND

Field

The present disclosure relates to communications devices, infrastructure equipment and methods for the cell reselection by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

According to some embodiments a communications device having performed cell reselection to a second cell, prior to the completion of an RRC Resume procedure in a first cell, initiates the RRC Resume procedure in the second cell. Thus, a suspended RRC connection can be resumed, permitting data or signalling to be transmitted with lower latency than if a new RRC connection were established instead. In one example, the data may be associated with the URLLC service and/or may have a requirement for transmission with very low latency.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
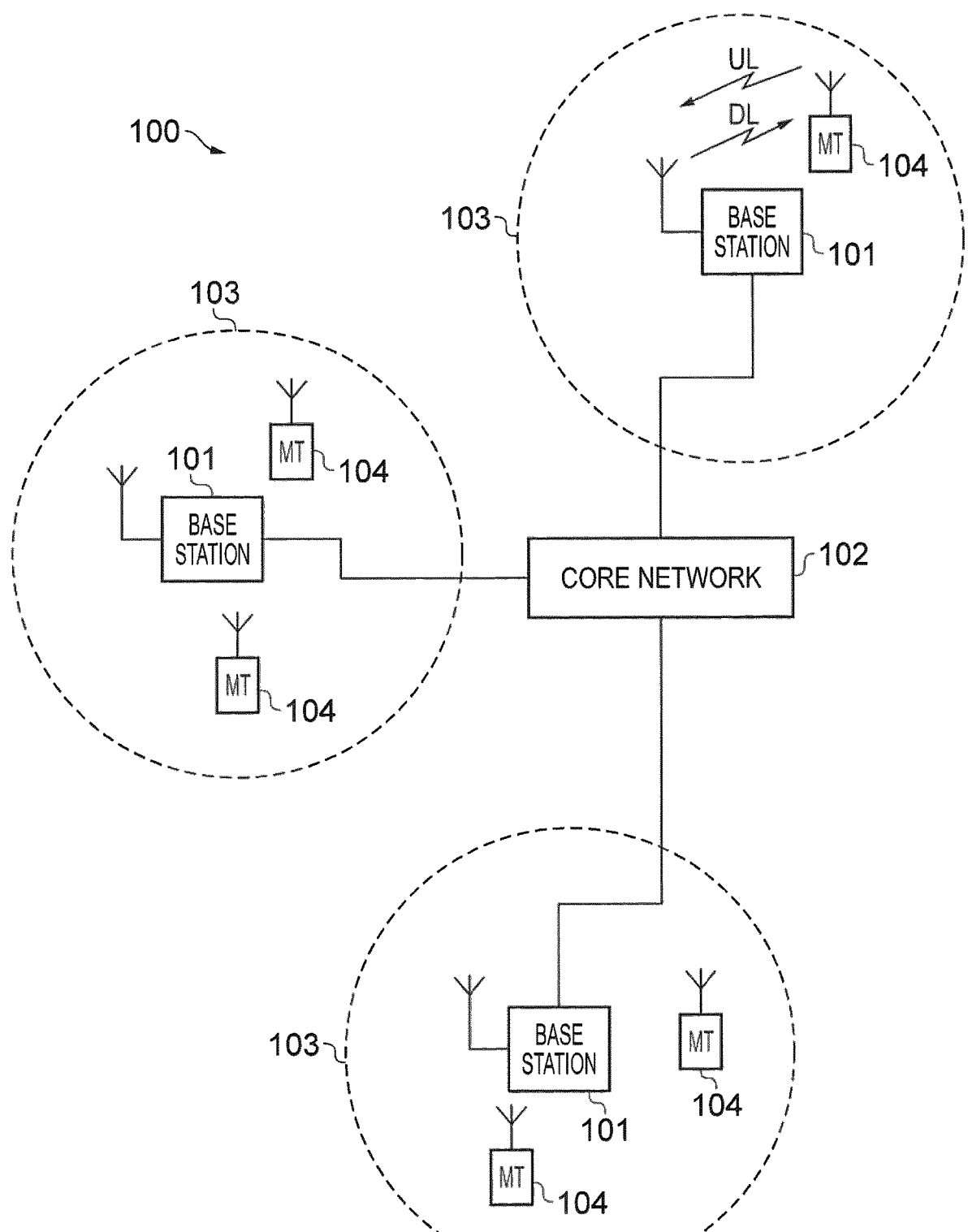
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [7]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.
New Radio Access Technology (5G)

Figure 2:
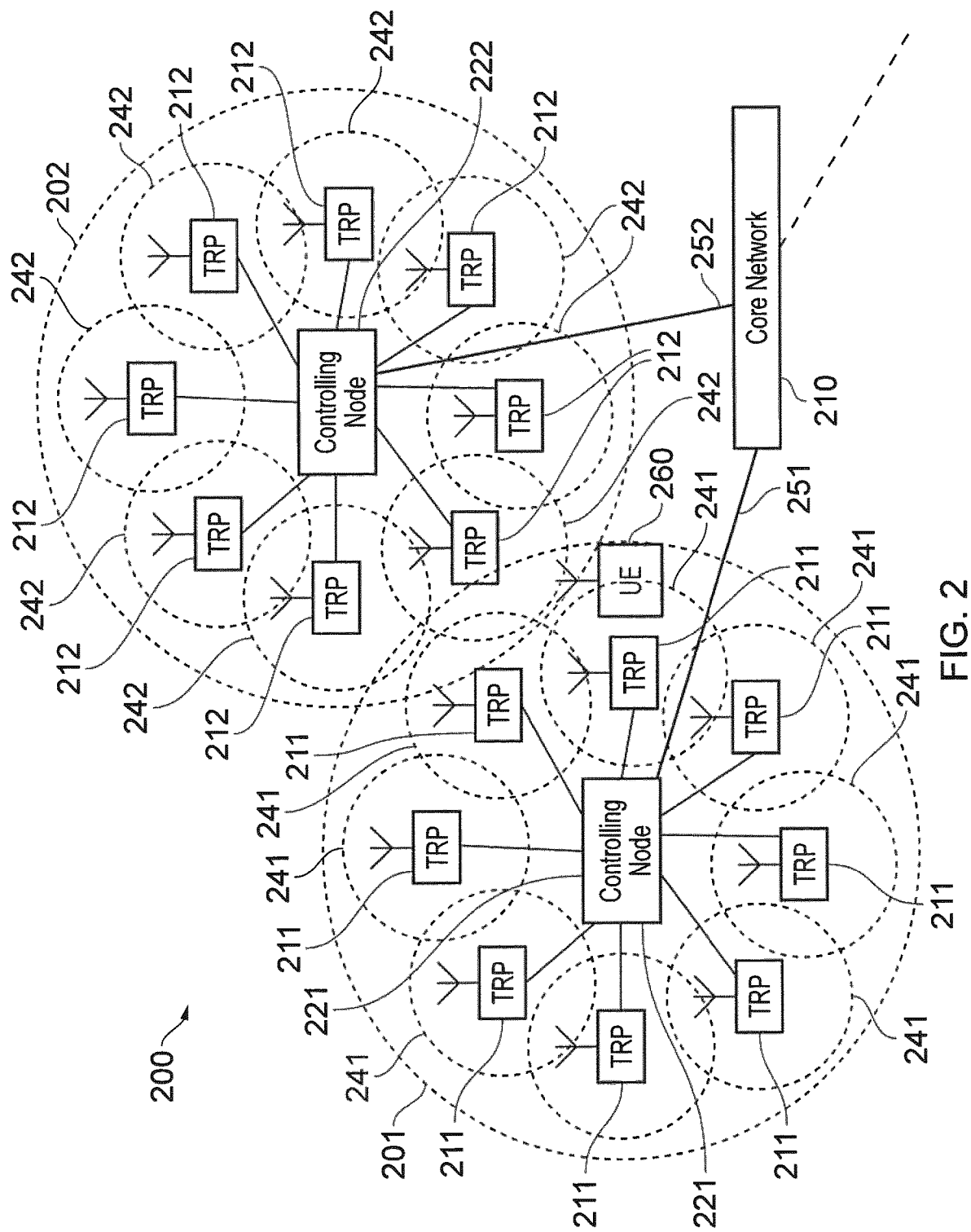
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
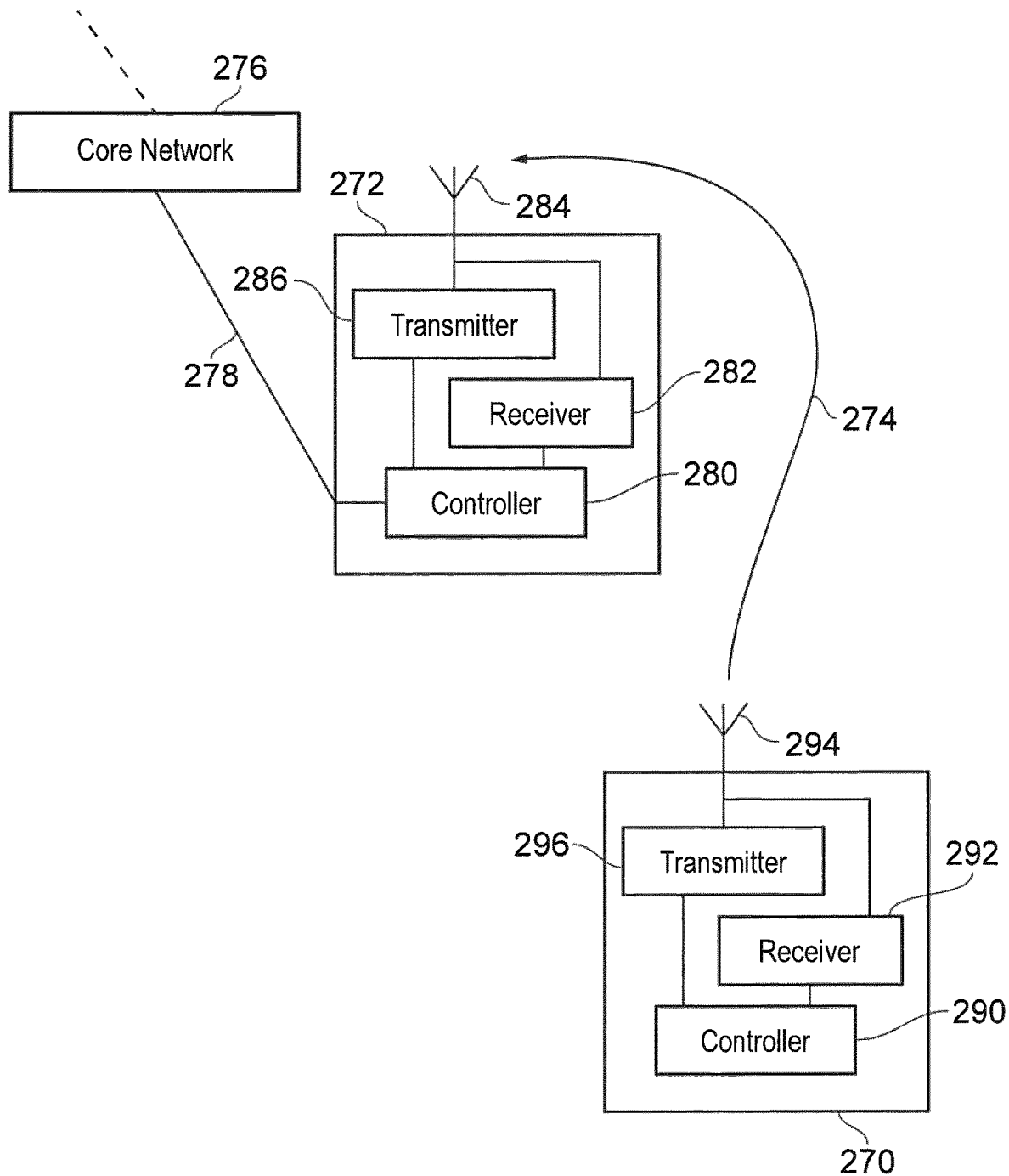
FIG. 3 is a schematic block diagram of an example infrastructure equipment and communications device which may be configured in accordance with example embodiments.

A more detailed illustration of a communications device 270 and an example network infrastructure equipment 272, which may be thought of as a gNB 101 or a combination of a controlling node 221 and TRP 211, is presented in FIG. 3. As shown in FIG. 3, the communications device 270 is shown to transmit uplink data to the infrastructure equipment 272 via grant free resources of a wireless access interface as illustrated generally by an arrow 274. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

Protocol Layers and Entities

Functionality of the infrastructure equipment 101, 272 and the communications device 104, 270 may be separated logically into different protocol entities.

Figure 4:
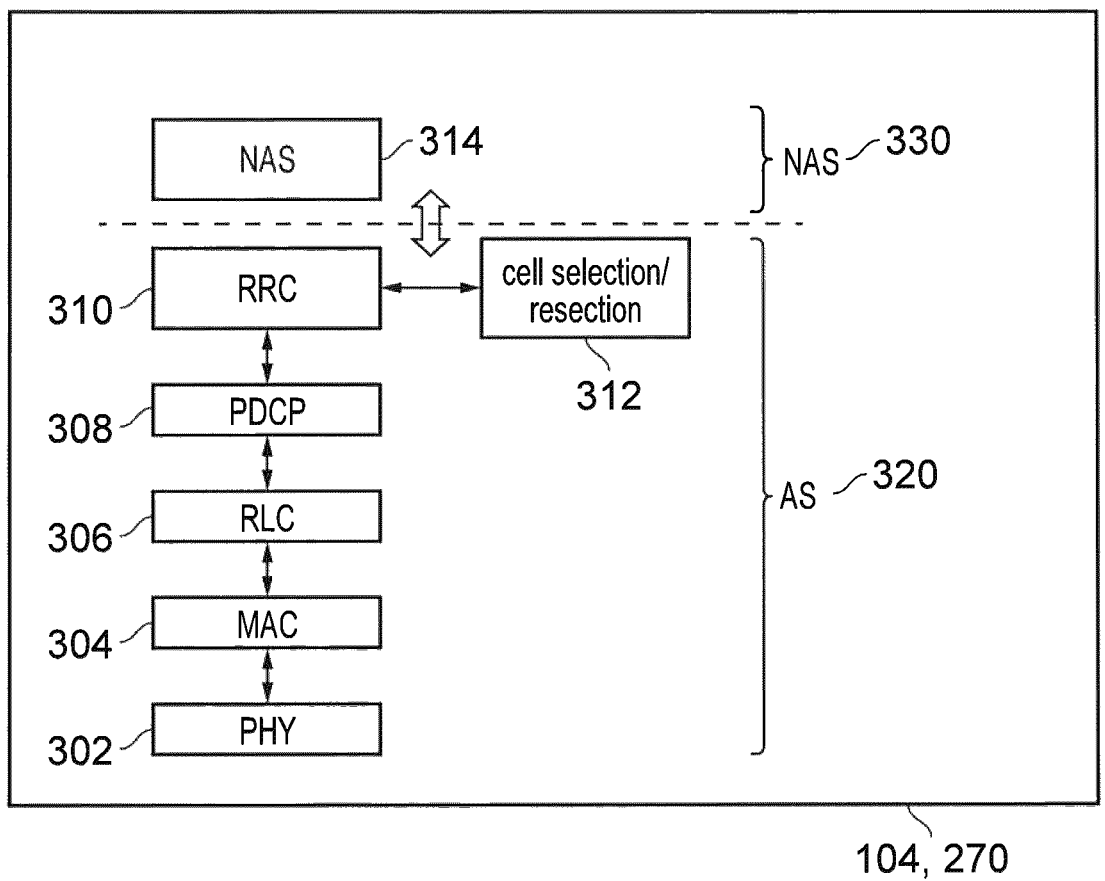
FIG. 4 is a block diagram showing protocol entities within a communications device which may be configured to operate in accordance with example embodiments.

FIG. 4 is a block diagram showing protocol entities within a communications device 104, 270 which may be configured to operate in accordance with example embodiments.

Protocol entities may be characterised by functions which they provide to other protocol entities. For example, a physical layer (PHY) protocol entity 302 may control the transmitter 296 and receiver 292 to transmit and receive signals representing data on the wireless access interface. The PHY protocol entity 302 may also provide an encoding and modulation function.

The PHY protocol entity 302 may provide these services to a medium access control (MAC) protocol entity 304, which in turn provides services to a radio link control (RLC) protocol entity 306. The RLC entity 306 interacts with a packet data convergence protocol (PDCP) entity 308.

A radio resource control (RRC) protocol entity 310 may process and generate messages relating to the operation of one or more of the PHY protocol entity 302, the MAC protocol entity 304 and the RLC protocol entity 306.

In addition, a cell selection/reselection function 312 may operate with the receiver 292 and the RRC protocol entity 310 to perform measurements of downlink signals received on the wireless access interface 274 in a serving cell and in candidate neighbour cells. The serving cell may be that in which an RRC connection may be, or is, established, and in which data may be transmitted and received.

The cell selection/reselection function 312 may operate differently according to the state associated with the RRC protocol entity 310. For example, when the RRC state is an RRC IDLE or RRC INACTIVE the cell selection/reselection function 312 may operate to determine that the serving cell should be changed based on the measurements.

When the RRC state is an RRC CONNECTED state, in which an active (i.e. not suspended) RRC connection is established with the infrastructure equipment 272, change of the serving cell may be controlled by the infrastructure equipment 272, and the cell selection/reselection function 312 may refrain from determining whether the serving cell should be changed.

The operation of each of the PHY protocol entity 302, the MAC protocol entity 304, the RLC protocol entity, the PDCP entity 308, the RRC protocol entity 310 and the cell selection/reselection function 312 may operate in a manner which is specific to the nature of the wireless access interface 274; for example, based on the wireless access interface 274 being operated in accordance with 5G/NR specifications. As such, these entities may be collectively referred to as Access Stratum (AS) entities, and thus be within an AS protocol layer 320.

The AS entities may provide services to one or more non-access stratum (NAS) protocol entities 314 within a NAS layer 330. Protocol entities in the NAS layer 300 may operate independently of the specific wireless access interface, and as such, for example, may operate in the same manner irrespective of whether the wireless access interface 274 operates in accordance with 5G/NR specifications, or with 4G/LTE specifications.

Each protocol entity, and the cell selection/reselection function 312 in the communications device 104, 270 may be implemented by the controller 290 in combination with the receiver 292 and transmitter 270 of the communications device.

Each of the protocol entities shown as being within the communications device 104 may have a corresponding peer entity within the wireless communications network, such as within the infrastructure equipment 272.

5G and URLLC

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [1] services are for a reliability of $1-10^{-5}$ (99.999%) or higher for one transmission of a 32 byte packet with a user plane latency of 1 ms [3]. In some scenarios, there may be a requirement for a reliability of $1-10^{-6}$ (99.9999%) or higher with either 0.5 ms or 1 ms of user plane latency. Massive Machine Type Communications (mMTC) is another example of a service which may be supported by NR-based communications networks.

RRC Inactive State and RAN Notification Area

The communications device 104 enters the RRC_INACTIVE state when an RRC connection is suspended. In the RRC INACTIVE state, the communications device remains in a connection management connected (CM-CONNECTED) state and can move within an area configured by the NextGen Radio Access Network (NG-RAN) without notifying NG-RAN. This area is referred to as a radio access network (RAN) notification area (RNA).

In RRC_INACTIVE, the last serving gNodeB node (i.e., the one controlling the cell in which the communications device 104 entered the RRC INACTIVE state) stores context associated with the communications device 104. The last serving gNodeB node may also maintain NG connections associated with the communications device 104 with one or more core network entities, which may include a serving access and mobility management function (AMF) and user plane function (UPF).

If the last serving gNodeB receives downlink data from the UPF or downlink signalling for the communications device 104 from the AMF (other than a UE Context Release Command message) while the communications device 104 is in the RRC_INACTIVE state, it transmits paging messages in the cells corresponding to the RNA, and may send XnAP RAN Paging to neighbour gNodeB(s) if the RNA includes cells of neighbour gNodeB(s).

At transition to RRC_INACTIVE the NG-RAN node may configure the communications device 104 with a periodic RNA Update timer value.

If the communications device 104 accesses a gNodeB other than the last serving gNodeB, the receiving gNodeB triggers the XnAP Retrieve UE Context procedure to get the context associated with the communications device 104 from the last serving gNodeB and may also trigger a Data Forwarding procedure including tunnel information for potential recovery of data from the last serving gNodeB. Upon successful UE context retrieval, the receiving gNodeB performs the slice-aware admission control in case of receiving slice information and becomes the serving gNodeB and it further triggers the NG application protocol (NGAP) Path Switch Request and RRC procedures properly. After the path switch procedure, the serving gNodeB triggers release of the UE context at the last serving gNodeB by means of the XnAP UE Context Release procedure.

The communications device 104, when in the RRC_INACTIVE state is required to initiate RNA update procedure when it moves out of the configured RNA. When receiving an RNA update request from the communications device 104, the receiving gNodeB triggers the XnAP Retrieve UE Context procedure to get the context associated with the communications device 104 from the last serving gNodeB, and may either send the communications device 104 back to RRC_INACTIVE state, move the communications device 104 into RRC_CONNECTED state, or send the communications device 104 to RRC_IDLE.

If the communications device 104 accesses a gNodeB other than the last serving gNodeB and the receiving gNodeB does not find a valid UE Context, the receiving gNodeB can perform establishment of a new RRC connection instead of resumption of the previous RRC connection.

The communications device 104, while in RRC_INACTIVE, performs cell reselection.

The RNA configured for the communications device 104 may cover either a single cell, or multiple cells, and may be smaller than the core network registration area. An RNA update (RNAU) is transmitted by the communications device 104 to the network periodically, and also when the communications device 104 performs cell reselection to a cell outside of the configured RNA.

RRC Resume Procedure

In accordance with conventional techniques, an RRC Resume procedure in a wireless telecommunications system may be initiated by the communications device 104 having a suspended RRC connection, to request that the suspended RRC connection is resumed. When an RRC connection is suspended, context relating to the cell configuration and PDCP state for the serving cell is stored by the communications device 104 and by the infrastructure equipment (e.g. gNB) of the serving cell, and the communications device 104 enters the RRC INACTIVE state, described above.

The RRC Resume procedure may be initiated by the communications device 104 in response to a trigger. The trigger may be initiated by upper layers (e.g. NAS layers) or by the access stratum of the communications device 104.

The RRC Resume procedure may comprise the transmission of an RRC Resume Request message on SRB0 using the CCCH by the communications device 104. The RRC Resume Request message may comprise a shortened version of an identifier of the communications device 104, such as a short radio network temporary identifier (RNTI) and an authentication token, such as a resumeMAC-I. The resume-MAC-I may be calculated based on a source physical cell identity, a target cell identity, and a source-C-RNTI, wherein the source physical cell identity and the source-C-RNTI correspond to the cell that the communications device 104 was connected to at the time of the suspension of the RRC connection, and the target cell identity is that of the cell in which the communications device 104 is attempting to resume the RRC connection. Upon sending the RRC Resume Request message, the communications device 104 may resume SRB1, including re-establishing the PDCP entities for SRB1.

If the gNB to which the RRC Resume Request message is transmitted is able to resume the RRC connection then it transmits in response a RRC Resume message on SRB1. In response to receiving the RRC Resume message, the communications device 104 restores its PDCP state and some cell configuration from its stored context. The RRC Resume message may include cell configuration parameters, which may be applied to the stored cell configuration parameters (for example, as a 'delta' or where any parameter present in the RRC Resume message replaces any corresponding parameter in the stored cell configuration), to derive the cell configuration parameters applicable in the current serving cell.

The communications device 104 enters RRC connected mode. Additional configuration may be carried out depending on the contents of the RRC Resume message.

Figure 5:
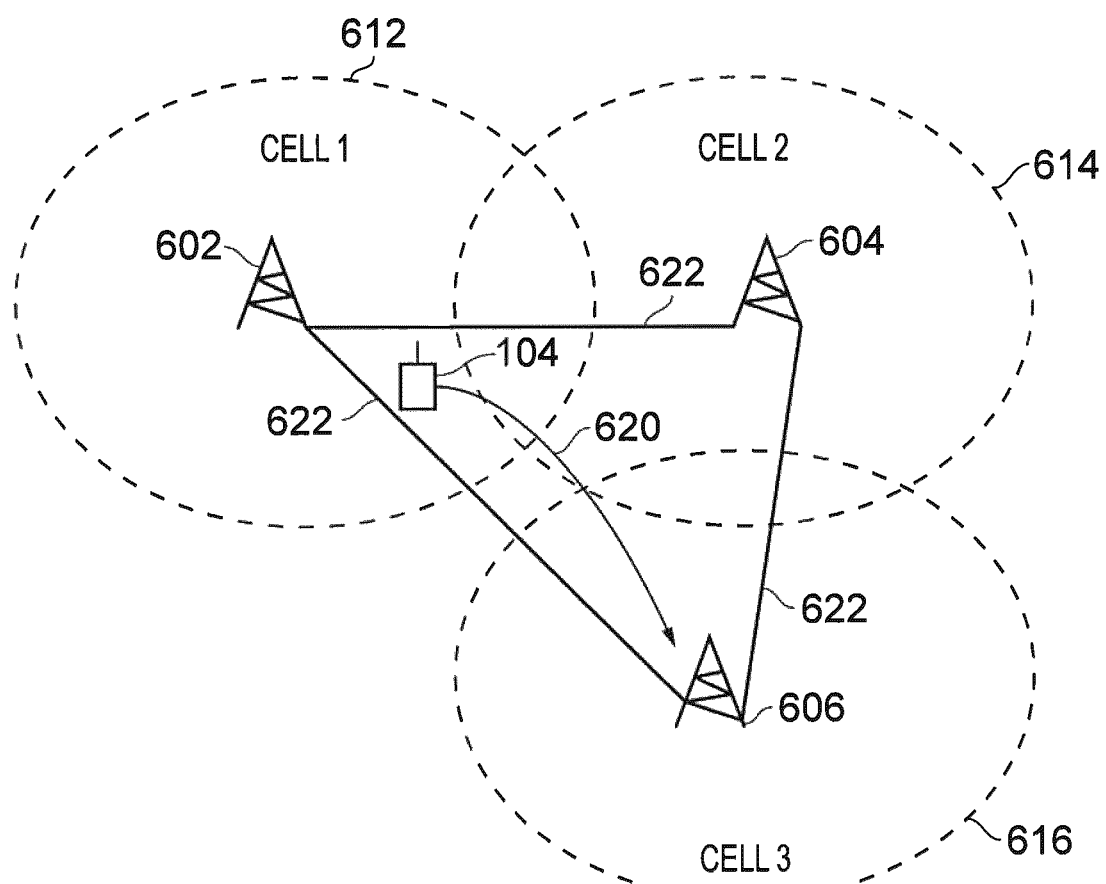
FIG. 5 schematically represents aspects of a wireless communications network and a path of a communications device.

FIG. 5 illustrates a portion of a wireless communications network and a motion of the communications device 104 which may give rise to a sequence of cell reselections, which may occur while the communications device 104 is in RRC INACTIVE.

FIG. 5 shows three gNBs, a first gNB 602 controlling a first cell 612, a second gNB 604 controlling a second cell 614, and a third gNB 606 controlling a third cell 616. Each of the first, second and third gNBs 602, 604, 606 may have broadly similar functionality to the infrastructure equipment 272 of FIG. 3.

The first, second and third gNBs 602, 604, 606 are connected to each other via inter-radio access node communications links 622, which may comprise an Xn or X2 interface.

Not shown in FIG. 5 is the core network part 102, to which the first, second and third gNBs 602, 604, 606 are connected.

A possible movement of the communications device 104 is indicated by the arrow 620, which shows the communications device 104 initially within the first cell 612, and moving, via the edge of the second cell 614, to the third cell 616.

Figure 6:
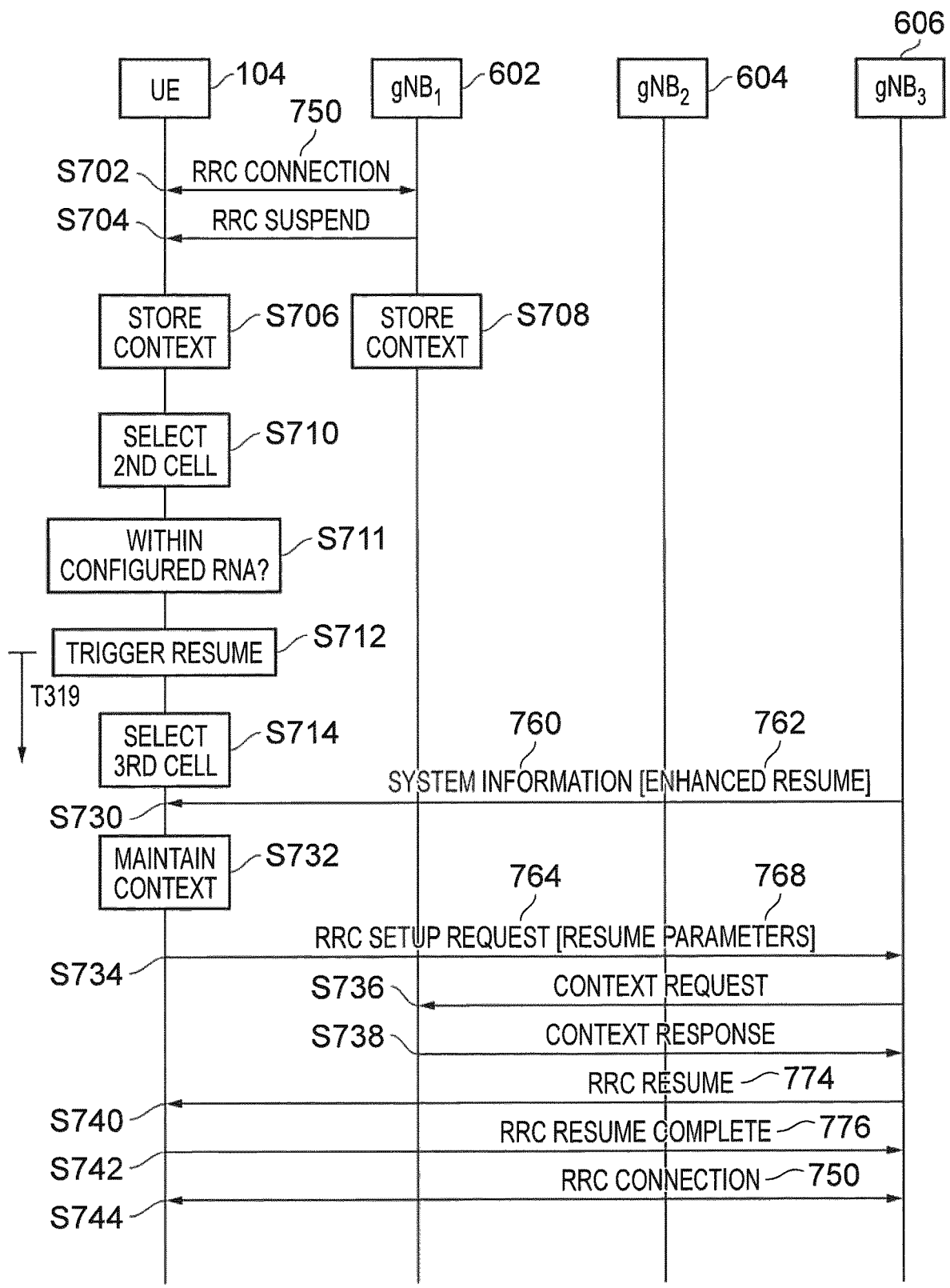
FIG. 6 illustrates a message sequence chart and flow diagram for a process of cell reselection which may be in accordance with conventional techniques.

FIG. 6 illustrates a message sequence chart and flow diagram for a process of cell reselection which may be according to conventional techniques, based on the example movement of the communications device 104 illustrated in FIG. 5.

The process starts at step S702 in which the communications device 104 establishes an RRC connection 750 with the first gNB 602 in the first cell 612.

Subsequently, at step S704, the RRC connection is suspended. The process at step S704 may be initiated by the first gNB 602 transmitting an RRC Release message to the communications device 104, indicating that the RRC connection 750 is to be suspended.

As a result of the suspension of the RRC connection 750, then at steps S706 and S708 respectively, the communications device 104 and the first gNB 602 store context associated with (i.e. comprising parameters of) the RRC connection 750. It will be appreciated that the stored context may in fact be a subset of context which was stored prior to the suspension of the RRC connection 750. The context stored by the first gNB 602 may further comprise parameters corresponding to one or more connections associated with the communications device 104 between the first gNB 602 and the core network part 102.

As a result of the suspension of the RRC connection 750, the communications device 104 enters the RRC INACTIVE state, and may be configured with an RNA. The configured RNA may include the first cell 612 and neither of the second or third cells 614, 616.

While in the RRC INACTIVE state, the communications device 104 carries out a cell reselection process (not shown), such as by the cell selection/reselection function 312. The cell reselection process may comprise performing measurements of downlink signals transmitted in the serving cell (i.e. the first cell 612 by the first gNB 602) and/or of downlink signals transmitted in one or more candidate cells (such as the second and third cells 614, 616). A cell different from the serving cell may be selected as a new serving cell, if one or more predetermined criteria are satisfied.

As a result of the cell reselection process, at step S710 the communications device 104 determines that the second cell 614 is to be selected as the serving cell.

At step S711, the communications device 104 determines whether the third cell 616 is within the RNA configured list of cells when the RRC connection was suspended at step S704.

In some example scenarios, the second cell 614 and third cell 616 do not belong to the RNA configured when the RRC connection was suspended at step S704.

In such scenarios, the communications device 104 determines that an RNA update is required. The communications device 104 may set an internal flag, or variable, accordingly to indicate this. This may be referred to as a pendingRnaUpdate variable, which may be a Boolean variable set to TRUE when the communications device 104 determines that an RNA Update is to be transmitted.

Subsequently, at step S712, the RRC layer of the communications device 104 determines that the RRC connection 750 is to be resumed, and in response, initiates an RRC Resume procedure. In example scenarios where an RNA update is required, the determination that the RNA update is required may be the trigger for performing RRC resume.

In some embodiments, the determination at step S712 may be in response to a trigger received from upper layers (e.g. a non-access stratum layer) of the communications device 104. The trigger may indicate that uplink data is available for transmission to the wireless communications network and/or may comprise the uplink data for transmission.

The initiation of the RRC Resume procedure may comprise starting a timer T319 to run for a predetermined duration (unless stopped otherwise). The timer T319 may be started upon transmission of an RRCResumeRequest (or the passing of the RRCResumeRequest from the RRC layer to lower layers in the communications device 104 for transmission). The timer T319 may trigger, on its expiry, the communications device 104 to enter the RRC IDLE state, and may ensure that the communications device 104 does not indefinitely wait for a response to the RRCResumeRequest message.

During the RRC Resume procedure, the communications device 104 continues to perform the cell reselection procedure (not shown).

In the example of FIG. 6, prior to the RRC Resume procedure being completed, the communications device 104 determines at step S714 that the third cell 616 is to be selected as the serving cell.

The communications device 104 may enter the RRC IDLE state at step S716. This may be in response to the determination at step S714 of the change of serving cell and, optionally, on a determination that the timer T319 is running. As a result (or otherwise) the communications device 104 may be no longer permitted to and/or no longer capable of resuming the RRC connection 750. In particular, the communications device 104 may, as a consequence of leaving the RRC INACTIVE mode, refrain from continuing to store the context which was originally stored at step S706 and which is required for a successful RRC Resume procedure.

Additionally or alternatively, the communications device 104 may, in response to the determination at step S714 and, optionally, the determination that the timer T319 is running, clear the flag or variable which indicates that an RNA update is required. For example, it may set the Boolean variable pendingRnaUpdate to FALSE.

Additionally, the communications device 104 may stop the timer T319 in response to the determination at step S714.

In accordance with conventional techniques, the communications device 104 may remain in this configuration (that is, having no active RRC connection) until a trigger is received at the access stratum, the trigger causing the access stratum to attempt to establish or resume an RRC connection.

Such a trigger may be received from upper layers, such as from a NAS layer indicating that there is uplink data available for transmission. Alternatively, the trigger may be received from the infrastructure equipment associated with the serving cell (e.g. the third gNB 606), such as a paging message.

In the example shown in FIG. 6, a trigger (not shown) is subsequently received at the access stratum of the communications device 104, and in response, at step S718, the communications device 104 initiates an RRC Connection establishment procedure.

The inventors have identified a number of ways in which the above process can be improved.

First, it has been recognised that RRC connection resumption allows a lower latency of data transmission than the establishment of an RRC connection from idle, according to conventional techniques.

According to some embodiments of the present technique, a communications device having performed cell reselection to a second cell, prior to the completion of an RRC Resume procedure in a first cell, initiates the RRC Resume procedure in the second cell. Thus, a suspended RRC connection can be resumed, permitting data or signalling to be transmitted with lower latency than if a new RRC connection were established instead. In particular, the data may be associated with the URLLC service and/or may have a requirement for transmission with very low latency.

Second, an identified disadvantage of a conventional technique is that no RNA update procedure is completed by the communications device 104 in response to the cell reselection (such as the cell reselection at step S714) whereby the third cell 616 is selected as its serving cell. This may result in a temporary mismatch between state information in the wireless communications network regarding the location of the communications device 104, and the actual location of the communications device 104. Specifically, the first gNB 602 may have stored information indicating that the communications device 104 is within the RNA which was configured for the communications device 104 as part of the RRC Resume process S704, and this may be maintained even though the communications device 104 has previously, at step S710 in the example of FIG. 6, left the configured RNA.

An undesirable consequence of this may be that downlink data for transmission to the communications device 104 is delayed, because paging attempts may be limited to the RNA in which the wireless communications network believes the communications device 104 to be located.

According to some embodiments of the present technique, a communications device having performed cell reselection to a new cell and determining that an RNA update is required, attempts to resume a suspended RRC connection in the new cell. Prior to the completion of the RRC Resume procedure, the communications device performs cell reselection to a second cell, and initiates the RNA update procedure in the second cell. Thus, the wireless communications network is updated regarding the mobility of the communications device outside of a configured RNA, and subsequent delays in subsequent downlink data transmission arising from incorrect information in the wireless communications network regarding the location of the communications device can be avoided.

Figure 7:
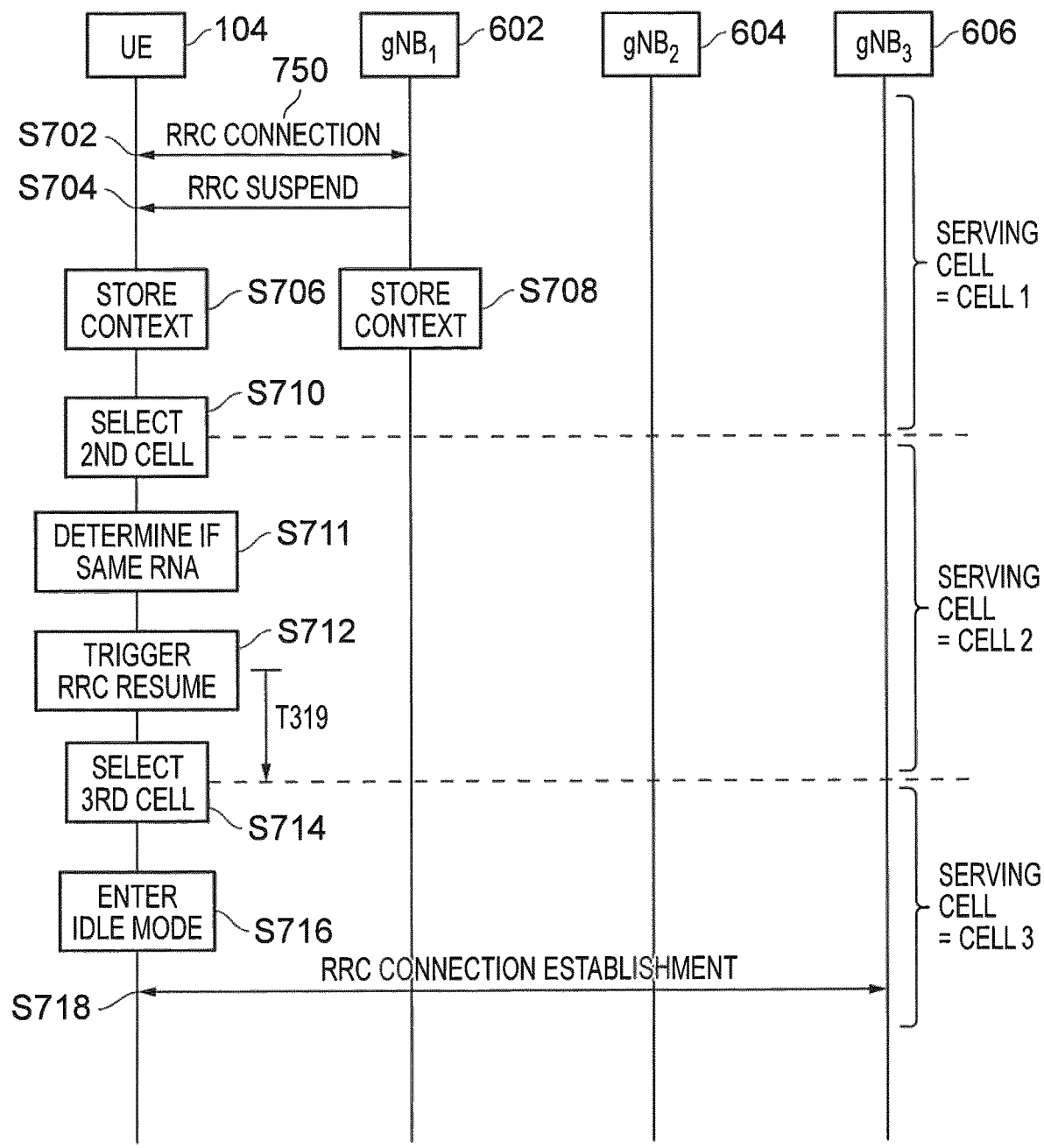
FIG. 7 illustrates a message sequence chart and flow diagram for a process of cell reselection in accordance with embodiments of the present disclosure.

FIG. 7 illustrates a message sequence chart and flow diagram for a process of cell reselection in accordance with embodiments of the present technique, based on the example movement of the communications device 104 illustrated in FIG. 5.

Many of the steps and features shown in FIG. 7 correspond to steps or features in FIG. 6. These are denoted by like reference numerals, and their description in the following is omitted for conciseness. In particular, the steps up to and including step S714 may be carried out as shown in FIG. 6 and described above.

In accordance with embodiments of the present technique, there is provided an enhanced resume procedure, which may be initiated by the communications device 104 after a cell reselection in certain circumstances, and which will be described in further detail below.

In some embodiments of the present technique, the communications device 104 receives system information 760 from the third gNB 606, at step S730. Step S730 may be carried out in response to the selection of the third cell 616 at step S714.

The system information 760 corresponds to (i.e. provides information regarding the operation of) the third cell 616, and may include an enhanced resume procedure indicator 762 which indicates whether or not the enhanced resume procedure is permitted. In some embodiments, if the system information 760 does not contain the enhanced resume procedure indicator 762, or the enhanced resume procedure indicator 762 is present but indicates that the enhanced resume procedure is not permitted, then the communications device may proceed with step S716 as illustrated in FIG. 6 and described above.

In some embodiments, the enhanced resume procedure indicator 762 may indicate one or more restrictions associated with the enhanced resume procedure. For example, in some embodiments, the enhanced resume procedure indicator 762 may indicate that the enhanced resume procedure is permitted only for the purpose of transmitting uplink data associated with a particular service, for example, the URLLC service.

In some embodiments, the enhanced resume procedure indicator 762 may be transmitted by the first gNB 602 to the communications device 104, for example, within the RRC Release message sent as part of the RRC suspend procedure at step S704.

In some embodiments, the enhanced resume procedure indicator 762 may indicate that the enhanced resume procedure is permitted only within certain cells. In some embodiments, the enhanced resume procedure indicator 762 may indicate one or both of:

whether the communications device 104 may request that a suspended RRC connection be resumed, after a cell reselection occurring while T319 is running, and/or whether the communications device 104 may perform an RNA update procedure after a cell reselection occurring while T319 is running.

In some embodiments, the subsequent behaviour of the communications device may depend on whether quality of service requirements associated with data to be transmitted, such as the data associated with the trigger received from the upper layers at step S712, satisfy predetermined conditions.

For example, the conditions may be satisfied where data to be transmitted is associated with a latency requirement permitting a delay not greater than a predetermined threshold. Additionally or alternatively, the conditions may be satisfied if the data is associated with the URLLC service.

If the conditions are not satisfied, then the communications device may proceed with step S716 and the subsequent steps as illustrated in FIG. 6 and described above.

If the conditions are satisfied, or no conditions apply, and in accordance with the enhanced resume procedure indicator 762 (if received) then the process may continue with step S732.

In step S732, the communications device 104 maintains context required for an enhanced resume procedure, which will be described in further detail. In some embodiments, the context may correspond to all of the context stored at step S706.

In some embodiments, if the internal flag, or variable (such as the pendingRnaUpdate variable) was set prior to the reselection at step S714 to indicate that an RNA Update is to be transmitted, then the internal flag or variable continues to be set to indicate that an RNA Update is to be transmitted. For example, a conventional requirement to set the variable pendingRnaUpdate to 'FALSE', if cell reselection occurs while T319 is running may be disregarded such that the pendingRnaUpdate variable remains set to 'TRUE'.

In some embodiments, in step S732 the communications device 104 remains in the RRC INACTIVE state, and refrains from entering the RRC IDLE state in response to the cell selection at step S714. In some embodiments, in step S732 the communications device 104 enters the RRC IDLE state but retains the stored context as described above.

Subsequent to the cell reselection at step S714, a trigger (not shown) prior to step S734 causes the communications device 104 to initiate the enhanced resume procedure. The trigger may be a determination that the variable pendingRnaUpdate is set to 'TRUE'.

Alternatively or additionally, the trigger may be received from upper layers, such as from the NAS layer indicating that there is uplink data available for transmission. Alternatively, the trigger may be received from the infrastructure equipment associated with the serving cell (e.g. the third gNB 606), such as a paging message.

In response to the trigger, at step S734, the communications device 104 initiates the enhanced resume procedure by transmitting an RRC message 764 to the third gNB 606, requesting the resumption of the RRC connection 750.

In some embodiments, the RRC message 764 is an RRC Resume Request message. In some embodiments, the RRC message 764 is an RRC Setup Request. The RRC message 764 comprises resume parameters 768.

The resume parameters 768 comprise an identity corresponding to the communications device 104 and, in some embodiments, a security token verifying the identity of the communications device 104. The identity may be a radio network temporary identity (RNTI) or a short RNTI. The security token may be a message authentication code (MAC).

The resume parameters 768 may comprise some or all of the parameters stored in the context at steps S732 and S706. The resume parameters 768 may comprise one or more parameters derived from one or more of the parameters stored in the context at steps S732 and S706. In some embodiments, the resume parameters 768 comprise parameters conventionally included within an RRC Resume Request message, such as an RRCResumeRequest-IEs structure defined in Abstract Syntax Notation One (ASN.1) as:

```
RRCResumeRequest-IEs ::=    SEQUENCE {
   resumeIdentity              ShortI-RNTI-Value,
   resumeMAC-I                 BIT STRING (SIZE (16)),
   resumeCause                 ResumeCause,
   spare                       BIT STRING (SIZE (1))
}
```

In some embodiments, the resume parameters 768 comprise the parameters of the RRCResumeRequest-IEs structure as defined above, but using a I-RNTI-Value instead of a ShortI-RNTI-Value.

The RRC message 764 may comprise a cause value indicating that the communications device 104 requests that an RRC connection, which has previously been suspended, be resumed. The RRC message 764 may comprise a cause value indicating that the communications device 104 intends to carry out an RNA update procedure.

The resume parameters 768 permit the third gNB 606 to identify a gNB having stored a context associated with a suspended RRC connection previously established by the communication device 104.

In response to receiving the RRC message 764 comprising the resume parameters 768, the third gNB 606 identifies the first gNB 602 as having stored the context associated with the RRC connection to be resumed. Accordingly, the third gNB 606 transmits at step S736, a context request message 770, comprising parameters identifying the communications device 104. These parameters may be some or all of the resume parameters 768, and may include an indication of the identity of the communications device 104 and a security token, as described above.

At step S738, the first gNB 602 retrieves the stored context, which was stored at step S708. The first gNB 602 may optionally validate the request, by comparing one or more parameters received in the context request message 770 with corresponding parameters in the stored context. In the example of FIG. 7, either no validation is carried out, or the validation is successful; in either case, the first gNB 602 transmits stored context to the third gNB 606.

Transmissions between the third gNB 606 and the first gNB 608 may be by means of one of the inter-radio access node communications links 622.

Based on the context obtained from the first gNB 602, then at step S740, the third gNB 606 transmits an RRC resume message 774 to the communications device 104. The RRC resume message 774 comprises an indication that the RRC connection 750 which was suspended at step S704 is to be resumed. In some embodiments, the third gNB 606 transmits instead an RRC setup message to the communications device 104 containing an indication that the RRC connection 750 which was suspended at step S704 is to be resumed.

In response to receiving the RRC resume message 774, the communications device 104 transmits an RRC Resume Complete message 776 at step S742, and the RRC Connection 750 is resumed at step S744.

The third gNB 606 may in some embodiments establish one or more connections with the core network part 102 which are associated with the communications device 104 for the transmission of uplink and/or downlink data. These connections may be established based on parameters forming a part of the context stored by the first gNB 602 at step S708, and transmitted to the third gNB 606 at step S738.

The enhanced resume procedure thus terminates and, by means of the RRC connection 750, the communications device 104 may transmit uplink data, such as the uplink data received from upper layers at step S712.

In embodiments where the trigger at step S712 comprised a determination that an RNA update is required, then following the resumption of the RRC connection 750 at step S744, the communications device 104 may transmit an RNA Update message to the third gNB 606.

In the example shown in FIG. 7, the third gNB 606 obtains the context from the first gNB 602 as a result of steps S736 and S738. In some embodiments, the third gNB 606 may determine whether the context has been (or can be) successfully obtained. It may not be possible for the third gNB 606 to obtain the context if, for example, there is no inter-radio access node communications link permitting the request at step S736 to be transmitted.

If the context has not been (or cannot be) successfully obtained, then the third gNB 606 transmits an RRC Setup message to the communications device 104 instructing the communications device 104 to establish a new RRC connection. Subsequently, a new RRC connection may be established between the communications device 104 and the third gNB 606.

In some embodiments, some or all of the resume parameters (based on, or forming part of, the context information stored by the communications device 104 at step S706) are transmitted in the RRC Resume Complete message 776. This may reduce the quantity of information transmitted in the RRC Setup Request message 764.

In some embodiments, instead of sending an RRC resume message at step S740, the third gNB 606 transmits an RRC Setup message comprising an indication that the RRC connection 750 is to be resumed.

Figure 8:
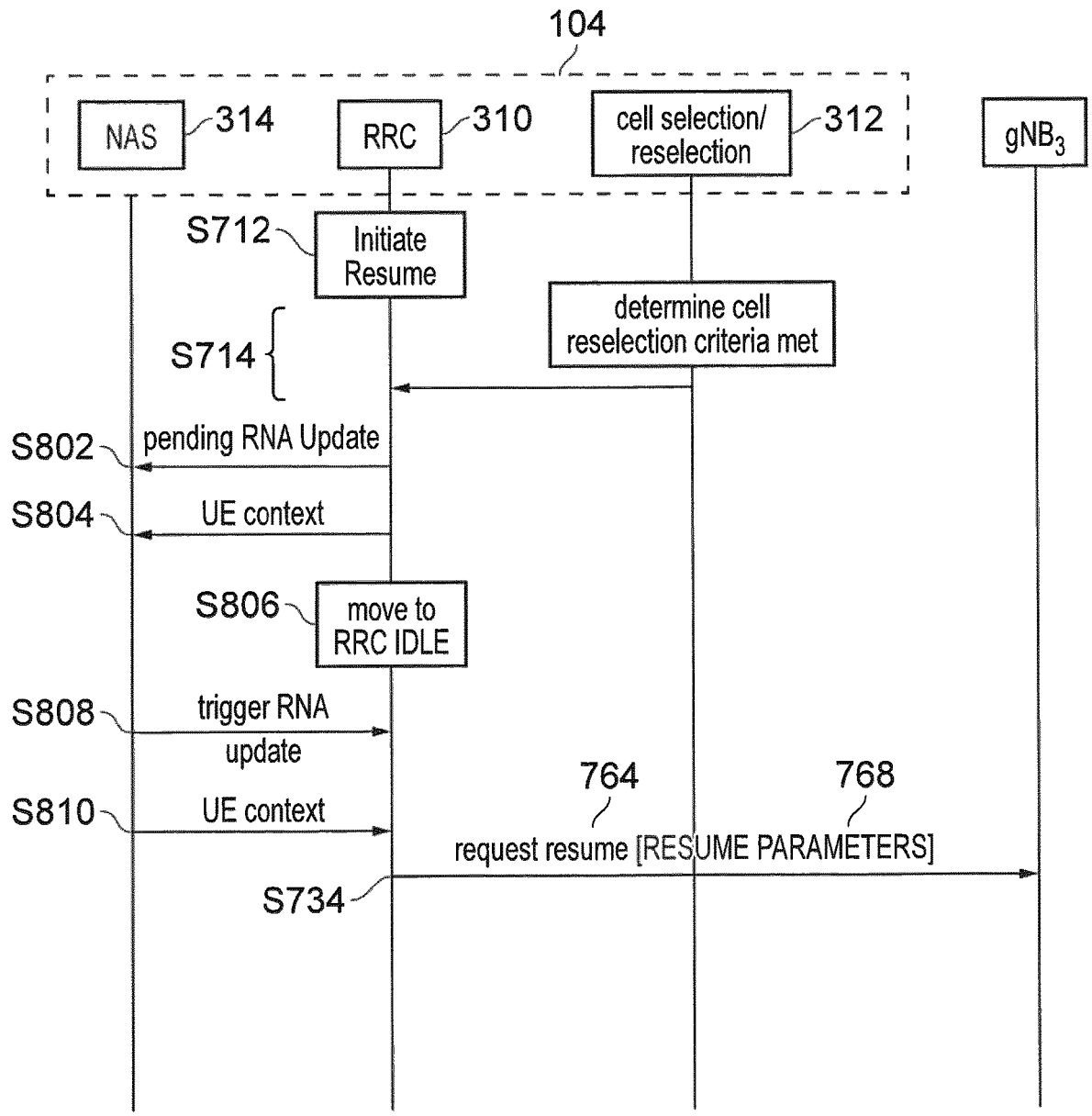
FIG. 8 illustrates a message sequence chart and flow diagram for a portion of a process of cell reselection in accordance with embodiments of the present disclosure.

FIG. 8 illustrates a portion of a cell reselection process in accordance with embodiments of the present technique.

In some embodiments of the present technique, the process may proceed as shown in FIG. 7 and described above up to and including step S712 in which a resume procedure is initiated by the RRC protocol entity 310 while the serving cell of the communications device 104 is the second cell 604.

Subsequently, as shown in FIG. 8, at step S714, the cell selection/reselection function 312 determines that the criteria for cell reselection to the third cell 606, and accordingly indicates this to the RRC protocol entity 310.

In response to determining that cell reselection is to occur, the RRC protocol entity 310 determines whether an RRC resume procedure had been initiated, but not completed, in a previous cell prior to cell reselection at step S714.

If this is the case, then in some embodiments, an access stratum protocol entity (such as the RRC protocol entity 310) indicates to the NAS protocol entity 314 within the NAS layer 330 at step S802 that an RNA update transmission is to be scheduled.

In some embodiments, at step S802, the RRC protocol entity 310 may indicate to the NAS protocol entity the value of the RnaUpdatePending variable, irrespective of its actual value.

In some embodiments, at step S804, the access stratum protocol entity indicates to the NAS protocol entity 314 that an RRC Resume procedure was initiated in a previous cell, but was not completed prior to a cell reselection and conveys to the NAS protocol entity 314 some or all of the parameters of the context stored at step S706. The indication at step S804 may implicitly or explicitly indicate that an RRC Resume procedure may be subsequently initiated by the RRC protocol entity 310, even if the RRC protocol entity 310 is in the RRC IDLE state.

In some embodiments, on receipt at step S804 of an indication of some of all of the parameters of the context stored at step S706, the NAS protocol entity 314 may start a timer, for a pre-determined time period. The parameters of the context may be considered valid only while the timer has not yet expired.

Subsequently or substantially at the same time, the RRC protocol entity 310 enters the RRC IDLE state at step S806.

Subsequently, at step s808, while the communications device 104 is in the RRC IDLE state, the NAS protocol entity 314 may, in response to receiving the indication at step S802 indicating that an RNA update is pending (e.g. that RnaUpdatePending is TRUE), generate a corresponding indication to the RRC protocol entity 310.

For example, if the RRC protocol entity 310 had previously indicated that an RNA update transmission is to be scheduled, the NAS protocol entity 314 may indicate this to the RRC protocol entity. The RRC protocol entity 310 may treat such an indication as a trigger to request an RRC connection in the new cell, as described above in the context of step S716 and S718.

At step S810, in response to receiving the indication at S804, the NAS protocol entity 314 may indicate to the RRC protocol entity 312 that the RRC protocol entity 314 may request resumption of a suspended RRC connection, for example by initiating an RRC Resume procedure. The indication at step S810 may be sent only if the NAS protocol entity 314 has sent an indication to the RRC protocol entity 310 that would, if the RRC protocol entity 310 were in the RRC IDLE state, trigger a request for the establishment of an RRC connection. For example, such an indication may comprise the indication sent at step S808, or an indication of uplink data to be transmitted.

At step S810, the parameters required for requesting a resumption of the RRC connection (such as the resume parameters 768 described above) may additionally be sent from the NAS protocol entity 314 to the RRC protocol entity 310.

Following step S810, the RRC protocol entity 310 may determine based on the indication at step S810 from the NAS protocol entity 314 that it may request a resumption of a previous RRC connection. The RRC resumption may be for the purpose of an RNA update as described above, or for the transmission of new uplink data, or for any other purpose.

Accordingly, the RRC protocol entity 310 may form a request resume message 764 comprising resume parameters 768 for transmission to the third gNB 606 in step S734, as described above in respect of FIG. 7

Embodiments where the NAS protocol entity is notified prior to the communications device 104 entering the RRC IDLE state may permit the communications device 104 to comply with certain conventional specifications for behaviour after cell reselection, and to comply with conventions restricting the storage of context at the RRC protocol entity 310 while the communications device 104 is in the RRC IDLE state.

In the example of FIG. 8, indications between the RRC protocol entity 310 and the NAS 314 are shown. However, in some embodiments, these indications (such as at one or more of steps S802, S804, S808, S810) may originate or terminate elsewhere within the access stratum 320 other than at the RRC protocol entity 310.

Above have been given descriptions of example processes combining sequences of steps and messages in combination. The scope of the present disclosure is not, however, limited to such specific combinations and some embodiments, various of the steps and messages described may be omitted, or combined in a different order, or modified.

For example, in some embodiments, the communications device may determine, after the cell selection at step S732, that an RNA update is required, but may carry out the RNA update by requesting an establishment of a new RRC connection.

Similarly, in some embodiments, the communications device may determine, after the cell selection at step S732, that the resumption of the suspended RRC connection 750 is possible, but may request the resumption only in response to a determination that uplink data is available for transmission and/or only in response to a paging message. In particular, the communications device 104 may request the resumption irrespective of whether a RNA update was previously determined to be required.

Thus there has been described a method of operating a communications device to perform cell reselection in a wireless communications network, the method comprising establishing a radio resource control, RRC, connection, suspending the RRC connection, transmitting a first message in a first cell, the message comprising a request that the RRC connection be resumed, before the RRC connection is resumed in the first cell, selecting as a serving cell a second cell different from the first cell, and transmitting a second message in the second cell, the second message comprising a request that the RRC connection be resumed.

There has further been described a method of operating a communications device to perform cell reselection in a wireless communications network, the method comprising establishing a radio resource control, RRC, connection, suspending the RRC connection, determining a radio access network-based (RAN-based) notification area (RNA), the RNA comprising a plurality of cells within which the communications device is not required to notify the wireless communications network of a cell reselection; selecting as a serving cell a first cell, the first cell not being within the RNA, transmitting a first message in the first cell, the message comprising a request that the RRC connection be resumed, before the RRC connection is resumed in the first cell, selecting as the serving cell a second cell different from the first cell, and transmitting in the second cell an RNA update indication indicating that the cell selected as the serving cell of the communications device is not within the RNA.

There has further been described a method of operating an infrastructure equipment in a wireless communications network, the method comprising transmitting an enhanced resume procedure indicator that indicates that a communications device is permitted to transmit an RNA update notification after a cell reselection procedure to a current serving cell which occurred prior to a completion of an RRC resume procedure in a previous serving cell.

There has further been described a method of operating an infrastructure equipment in a wireless communications network, the method comprising transmitting an indicator which indicates that a communications device is permitted to request that an RRC connection be resumed after a cell reselection procedure to a current serving cell which occurred prior to a completion of an RRC resume procedure in a previous serving cell.

Communications devices and infrastructure equipment have also been disclosed.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a communications device to perform cell reselection in a wireless communications network, the method comprising establishing a radio resource control, RRC, connection, suspending the RRC connection, transmitting a first message in a first cell, the message comprising a request that the RRC connection be resumed, before the RRC connection is resumed in the first cell, selecting as a serving cell a second cell different from the first cell, and transmitting in the second cell a request that the RRC connection be resumed.

Paragraph 2. A method according to paragraph 1, the method comprising receiving from an infrastructure equipment an indicator that indicates that the communications device is permitted to request that the RRC connection be resumed, wherein the indicator indicates that the communications device is permitted to request that the RRC connection is resumed after a cell reselection procedure to a current serving cell which occurred prior to a completion of an RRC resume procedure in a previous serving cell.

Paragraph 3. A method of operating a communications device to perform cell reselection in a wireless communications network, the method comprising establishing a radio resource control, RRC, connection, suspending the RRC connection, determining a radio access network-based (RAN-based) notification area (RNA), the RNA comprising a plurality of cells within which the communications device is not required to notify the wireless communications network of a cell reselection; selecting as a serving cell a first cell, the first cell not being within the RNA, transmitting a first message in the first cell, the message comprising a request that the RRC connection be resumed, before the RRC connection is resumed in the first cell, selecting as the serving cell a second cell different from the first cell, and transmitting in the second cell an RNA update indication indicating that the cell selected as the serving cell of the communications device is not within the RNA.

Paragraph 4. A method according to paragraph 3, wherein determining the RNA comprises receiving an indication of the plurality of cells in the RNA from the infrastructure equipment associated with a cell in which the RRC connection was suspended.

Paragraph 5. A method according to paragraph 3 or paragraph 4, the method comprising receiving from an infrastructure equipment an enhanced resume procedure indicator that indicates that the communications device is permitted to transmit the RNA update indication in the second cell, wherein the enhanced resume procedure indicator indicates that the communications device is permitted to transmit an RNA update indication after a cell reselection procedure to a current serving cell which occurred prior to a completion of an RRC resume procedure in a previous serving cell.

Paragraph 6. A method according to any of paragraphs 3 to 5, the method comprising in response to selecting as the serving cell the second cell, indicating by an access stratum (AS) to a non-access stratum (NAS) protocol entity that an RNA update is pending, and receiving by the AS an indication from the NAS protocol entity that the RNA update is pending, wherein transmitting the RNA update indication is in response to the receiving by the AS the indication from the NAS protocol entity that the RNA update is pending.

Paragraph 7. A method according to paragraph 6, wherein the AS comprises an RRC protocol entity, and indicating by the access stratum (AS) to the non-access stratum (NAS) protocol entity that the RNA update is pending comprises indicating by the RRC protocol entity to the non-access stratum (NAS) protocol entity that the RNA update is pending.

Paragraph 8. A method according to any of paragraphs 3 to 7, the method comprising transmitting in the second cell a request that the RRC connection be resumed.

Paragraph 9. A method according to paragraph 8, wherein the request that the RRC connection be resumed and the RNA update indication are transmitted within a single message.

Paragraph 10. A method according to any of paragraph 1, paragraph 2, paragraph 8 or paragraph 9, wherein the request that the RRC connection be resumed comprises resume parameters, the resume parameters comprising an indication of an identity of the communications device and an authentication token.

Paragraph 11. A method according to paragraph 1 or paragraph 2 or any of paragraphs 8 to 10, wherein the request that the RRC connection be resumed comprises an indication of an infrastructure equipment associated with a cell in which the RRC connection was suspended.

Paragraph 12. A method according to paragraph 10 or paragraph 11, the method comprising in response to selecting as the serving cell the second cell, indicating by an access stratum (AS) to a non-access stratum (NAS) protocol entity the resume parameters, and receiving by the AS from the NAS protocol entity the resume parameters, wherein transmitting the second message in the second cell is in response to the receiving by the AS from the NAS protocol entity the resume parameters.

Paragraph 13. A method according to paragraph 12, wherein the AS comprises an RRC protocol entity, and indicating by the access stratum (AS) to the non-access stratum (NAS) protocol entity the resume parameters comprises indicating by the RRC protocol entity to the non-access stratum (NAS) protocol entity the resume parameters.

Paragraph 14. A method according to any of paragraphs 1 to 13, the method comprising in response to selecting as the serving cell the second cell, entering an RRC Idle state.

Paragraph 15. A method according to any of paragraphs 1 to 14, the method comprising in response to suspending the RRC connection, entering an RRC Inactive state in which the communications device stores a context comprising an identity of the communications device assigned by the wireless communications network.

Paragraph 16. A method of operating an infrastructure equipment in a wireless communications network, the method comprising transmitting an enhanced resume procedure indicator that indicates that a communications device is permitted to transmit an RNA update notification after a cell reselection procedure to a current serving cell which occurred prior to a completion of an RRC resume procedure in a previous serving cell.

Paragraph 17. A method of operating an infrastructure equipment in a wireless communications network, the method comprising transmitting an indicator which indicates that a communications device is permitted to request that an RRC connection be resumed after a cell reselection procedure to a current serving cell which occurred prior to a completion of an RRC resume procedure in a previous serving cell.

Paragraph 18. A communications device for use in a wireless communications network, the wireless communications network comprising an infrastructure equipment providing a wireless access interface, the communications device comprising a transmitter configured to transmit data via the wireless access interface, a receiver configured to receive signals, and a controller configured to control the transmitter and the receiver so that the communications device is operable: to establish a radio resource control, RRC, connection, to suspend the RRC connection, to transmit a first message in a first cell, the message comprising a request that the RRC connection be resumed, before the RRC connection is resumed in the first cell, to select as a serving cell a second cell different from the first cell, and to transmit in the second cell a request that the RRC connection be resumed.

Paragraph 19. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to establish a radio resource control, RRC, connection, to suspend the RRC connection, to transmit a first message in a first cell, the message comprising a request that the RRC connection be resumed, before the RRC connection is resumed in the first cell, to select as a serving cell a second cell different from the first cell, and to transmit in the second cell a request that the RRC connection be resumed.

Paragraph 20. A communications device for use in a wireless communications network, the wireless communications network comprising an infrastructure equipment providing a wireless access interface, the communications device comprising a transmitter configured to transmit data via the wireless access interface, a receiver configured to receive signals, and a controller configured to control the transmitter and the receiver so that the communications device is operable: to establish a radio resource control, RRC, connection, to suspend the RRC connection, to determine a radio access network-based (RAN-based) notification area (RNA), the RNA comprising a plurality of cells within which the communications device is not required to notify the wireless communications network of a cell reselection; to select as a serving cell a first cell, the first cell not being within the RNA, to transmit a first message in the first cell, the message comprising a request that the RRC connection be resumed, before the RRC connection is resumed in the first cell, to select as the serving cell a second cell different from the first cell, and to transmit in the second cell an RNA update indication indicating that the cell selected as the serving cell of the communications device is not within the RNA.

Paragraph 21. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to establish a radio resource control, RRC, connection, to suspend the RRC connection, to determine a radio access network-based (RAN-based) notification area (RNA), the RNA comprising a plurality of cells within which the communications device is not required to notify the wireless communications network of a cell reselection; to select as a serving cell a first cell, the first cell not being within the RNA, to transmit a first message in the first cell, the message comprising a request that the RRC connection be resumed, before the RRC connection is resumed in the first cell, to select as the serving cell a second cell different from the first cell, and to transmit in the second cell an RNA update indication indicating that the cell selected as the serving cell of the communications device is not within the RNA.

Paragraph 22. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit an enhanced resume procedure indicator that indicates that the communications device is permitted to transmit an RNA update notification after a cell reselection procedure to a current serving cell which occurred prior to a completion of an RRC resume procedure in a previous serving cell.

Paragraph 23. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit an enhanced resume procedure indicator that indicates that the communications device is permitted to transmit an RNA update notification after a cell reselection procedure to a current serving cell which occurred prior to a completion of an RRC resume procedure in a previous serving cell.

Paragraph 24. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit an indicator which indicates that the communications device is permitted to request that an RRC connection be resumed after a cell reselection procedure to a current serving cell which occurred prior to a completion of an RRC resume procedure in a previous serving cell.

Paragraph 25. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit an indicator which indicates that the communications device is permitted to request that an RRC connection be resumed after a cell reselection procedure to a current serving cell which occurred prior to a completion of an RRC resume procedure in a previous serving cell.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.
[2] 3GPP T538.321, "Medium Access Control (MAC) protocol specification (Rd-15)", v15.3.0
[3] R2-1818795, "LS on Intra-UE Prioritization/Multiplexing," RAN2, RAN2 #104
[4] RP-182089, "New SID on Physical Layer Enhancements for NR Ultra-Reliable and Low Latency Communication (URLLC)," RAN #81.
[5] 3GPP TR38.824, "Study on physical layer enhancements for NR ultra-reliable and low latency case (URLLC) (Rel-16)," v1.0.0
[6] 3GPP TS 38.300 v. 15.2.0 "NR; NR and NG-RAN Overall Description; Stage 2 (Release 15)", June 2018
[7] Holma H. and Toskala A, "LTE for UMTS OFDMA and SC-FDMA based radio access", John Wiley and Sons, 2009

What is claimed is:

1. A method of operating a communications device to perform cell reselection in a wireless communications network, the method comprising;
    establishing a radio resource control (RRC) connection,
    suspending the RRC connection,
    transmitting a first message in a first cell, the message comprising a request that the RRC connection be resumed,
    before the RRC connection is resumed in the first cell, selecting as a serving cell a second cell different from the first cell, and
    transmitting in the second cell a request that the RRC connection be resumed.

2. The method according to claim 1, the method comprising;
    receiving from an infrastructure equipment an indicator that indicates that the communications device is permitted to request that the RRC connection be resumed, wherein
    the indicator indicates that the communications device is permitted to request that the RRC connection is resumed after a cell reselection procedure to a current serving cell which occurred prior to a completion of an RRC resume procedure in a previous serving cell.

3. A method of operating a communications device to perform cell reselection in a wireless communications network, the method comprising:
    establishing a radio resource control (RRC) connection,
    suspending the RRC connection,
    determining a radio access network-based (RAN-based) notification area (RNA), the RNA comprising a plurality of cells within which the communications device is not required to notify the wireless communications network of a cell reselection;
    selecting as a serving cell a first cell, the first cell not being within the RNA,
    transmitting a first message in the first cell, the message comprising a request that the RRC connection be resumed,
    before the RRC connection is resumed in the first cell, selecting as the serving cell a second cell different from the first cell, and
    transmitting in the second cell an RNA update indication indicating that the cell selected as the serving cell of the communications device is not within the RNA.

4. The method according to claim 3, wherein determining the RNA comprises receiving an indication of the plurality of cells in the RNA from the infrastructure equipment associated with a cell in which the RRC connection was suspended.

5. The method according to claim 3, the method comprising:
    receiving from an infrastructure equipment an enhanced resume procedure indicator that indicates that the communications device is permitted to transmit the RNA update indication in the second cell, wherein
    the enhanced resume procedure indicator indicates that the communications device is permitted to transmit an RNA update indication after a cell reselection procedure to a current serving cell which occurred prior to a completion of an RRC resume procedure in a previous serving cell.

6. The method according to claim 3, the method comprising:
    in response to selecting as the serving cell the second cell, indicating by an access stratum (AS) to a non-access stratum (NAS) protocol entity that an RNA update is pending, and
    receiving by the AS an indication from the NAS protocol entity that the RNA update is pending, wherein
    transmitting the RNA update indication is in response to the receiving by the AS the indication from the NAS protocol entity that the RNA update is pending.

7. The method according to claim 6, wherein the AS comprises an RRC protocol entity, and indicating by the access stratum (AS) to the non-access stratum (NAS) protocol entity that the RNA update is pending comprises indicating by the RRC protocol entity to the non-access stratum (NAS) protocol entity that the RNA update is pending.

8. The method according to claim 3, the method comprising transmitting in the second cell a request that the RRC connection be resumed.

9. The method according to claim 8, wherein the request that the RRC connection be resumed and the RNA update indication are transmitted within a single message.

10. The method according to claim 1, wherein the request that the RRC connection be resumed comprises resume parameters, the resume parameters comprising an indication of an identity of the communications device and an authentication token.

11. The method according to claim 1, wherein the request that the RRC connection be resumed comprises an indication of an infrastructure equipment associated with a cell in which the RRC connection was suspended.

12. The method according to claim 10, the method comprising:
in response to selecting as the serving cell the second cell, indicating by an access stratum (AS) to a non-access stratum (NAS) protocol entity the resume parameters, and
receiving by the AS from the NAS protocol entity the resume parameters, wherein
transmitting the second message in the second cell is in response to the receiving by the AS from the NAS protocol entity the resume parameters.

13. The method according to claim 12, wherein the AS comprises an RRC protocol entity, and indicating by the access stratum (AS) to the non-access stratum (NAS) protocol entity the resume parameters comprises indicating by the RRC protocol entity to the non-access stratum (NAS) protocol entity the resume parameters.

14. The method according to claim 1, the method comprising in response to selecting as the serving cell the second cell, entering an RRC Idle state.

15. The method according to claim 1, the method comprising in response to suspending the RRC connection, entering an RRC Inactive state in which the communications device stores a context comprising an identity of the communications device assigned by the wireless communications network.

16. A method of operating an infrastructure equipment in a wireless communications network, the method comprising:
transmitting an enhanced resume procedure indicator that indicates that a communications device is permitted to transmit an RNA update notification after a cell reselection procedure to a current serving cell which occurred prior to a completion of an RRC resume procedure in a previous serving cell.

17. A method of operating an infrastructure equipment in a wireless communications network, the method comprising:
transmitting an indicator which indicates that a communications device is permitted to request that an RRC connection be resumed after a cell reselection procedure to a current serving cell which occurred prior to a completion of an RRC resume procedure in a previous serving cell.

18. The method according to claim 16, wherein the enhanced resume procedure indicator indicates that the communications device is permitted to transmit an RNA update notification after a cell reselection procedure to a current serving cell only for uplink data corresponding to certain services.

19. The method according to claim 18, wherein the certain services include ultra reliable low latency communications (URLLC) services.

* * * * *